US012630209B2

(12) United States Patent
Zhong

(10) Patent No.: US 12,630,209 B2
(45) Date of Patent: May 19, 2026

(54) SEAT AND BABY CARRIAGE

(71) Applicant: Wonderland Switzerland AG, Steinhausen (CH)

(72) Inventor: Zhiren Zhong, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 581 days.

(21) Appl. No.: 17/950,074

(22) Filed: Sep. 21, 2022

(65) Prior Publication Data

US 2023/0099871 A1 Mar. 30, 2023

(30) Foreign Application Priority Data

Sep. 30, 2021 (CN) .......................... 202111164861.X

(51) Int. Cl.
| | |
|---|---|
| *B62B 9/08* | (2006.01) |
| *B62B 7/06* | (2006.01) |
| *B62B 7/14* | (2006.01) |
| *B62B 9/10* | (2006.01) |
| *B62B 9/14* | (2006.01) |

(52) U.S. Cl.
CPC .................. *B62B 9/08* (2013.01); *B62B 7/06* (2013.01); *B62B 7/142* (2013.01); *B62B 9/104* (2013.01); *B62B 9/142* (2013.01)

(58) Field of Classification Search
CPC ....... B62B 2206/06; B62B 7/00; B62B 7/002; B62B 7/06; A47D 1/004; A47D 1/04; A47D 1/0085; A47D 1/06; F16B 1/105
See application file for complete search history.

(56) References Cited

U.S. PATENT DOCUMENTS

| | | | | | |
|---|---|---|---|---|---|
| 3,294,440 | A | * | 12/1966 | Broder ..................... | A47C 3/34 248/188.5 |
| 4,165,854 | A | | 8/1979 | Duly | |
| 5,509,719 | A | * | 4/1996 | Cone, II ................. | A47D 1/004 248/188.5 |
| 6,581,737 | B2 | * | 6/2003 | Wang ..................... | B27B 29/00 280/655 |
| 7,753,448 | B2 | * | 7/2010 | Chen ..................... | A47D 1/023 297/16.1 |

(Continued)

FOREIGN PATENT DOCUMENTS

| | | |
|---|---|---|
| CN | 101722974 A | 6/2010 |
| CN | 204526882 U | 8/2015 |

(Continued)

*Primary Examiner* — Emma K Frick
(74) *Attorney, Agent, or Firm* — Winston Hsu

(57) ABSTRACT

A seat includes a support base, an unlock member and a lock member. The support base has at least one through hole. The unlock member is movably disposed on the support base and has at least one first driving portion. The lock member is movably disposed on the unlock member. The lock member has at least one lock portion protruding from a surface of the support base through the at least one through hole and at least one second driving portion abutting against the at least one first driving portion. When the unlock member is forced in a first direction to move, the at least one lock portion is forced to move along the at least one first driving portion through the at least one second driving portion and retracts into the support base in a second direction different from the first direction.

26 Claims, 5 Drawing Sheets

(56)                References Cited

U.S. PATENT DOCUMENTS

| | | | | |
|---|---|---|---|---|
| 7,789,402 | B2 * | 9/2010 | Saville | B62B 7/145 |
| | | | | 280/47.38 |
| 8,029,014 | B2 * | 10/2011 | Ahnert | B62B 9/102 |
| | | | | 280/47.38 |
| 8,109,687 | B2 * | 2/2012 | Xu | F16B 7/105 |
| | | | | 403/109.8 |
| 8,128,119 | B2 * | 3/2012 | Saville | B62B 7/062 |
| | | | | 280/648 |
| 8,136,831 | B1 * | 3/2012 | Caruso | B62B 7/145 |
| | | | | 280/47.38 |
| 8,157,327 | B2 * | 4/2012 | Tomasi | A47D 1/002 |
| | | | | 297/451.3 |
| 8,469,423 | B1 * | 6/2013 | Crowley, Jr. | B25G 1/04 |
| | | | | 403/328 |
| 9,428,208 | B1 * | 8/2016 | Chen | B62B 9/185 |
| 9,962,011 | B1 * | 5/2018 | Eyman | B62B 9/12 |
| 12,329,291 | B2 * | 6/2025 | Hartenstine | A47D 1/10 |
| 2008/0290699 | A1 * | 11/2008 | Golias | A47D 1/004 |
| | | | | 297/16.1 |
| 2009/0033066 | A1 | 2/2009 | Saville | |
| 2013/0277949 | A1 * | 10/2013 | Yin | B62B 7/064 |
| | | | | 280/658 |

FOREIGN PATENT DOCUMENTS

| | | | | |
|---|---|---|---|---|
| CN | 105539561 A | 5/2016 | | |
| CN | 105559431 A | 5/2016 | | |
| CN | 206456426 U | 9/2017 | | |
| CN | 109602214 A | 4/2019 | | |
| CN | 209807760 U | 12/2019 | | |
| EP | 1992543 A1 * | 11/2008 | | B62B 7/142 |
| JP | 59-103675 U | 7/1984 | | |
| JP | 61-207242 U | 12/1986 | | |
| JP | 2007-97815 A | 4/2007 | | |
| TW | 202132150 A | 9/2021 | | |

* cited by examiner

SEAT AND BABY CARRIAGE

BACKGROUND OF THE INVENTION

1. Field of the Invention

The invention relates to a seat and a baby carriage and, more particularly, to a seat with convenient operation and simple structure and a baby carriage equipped with the seat.

2. Description of the Prior Art

A stroller is a tool used by parents to carry babies or children when they go shopping. At present, a seat of some strollers has a height adjusting mechanism for a user to adjust the height of the seat depending on different babies or children, thereby making the babies or children more comfortable. However, the height adjusting mechanism of the conventional seat is not only cumbersome to operate, but also complicated. Thus, it is inconvenient in operation and maintenance and also increases the manufacturing cost of the stroller.

SUMMARY OF THE INVENTION

The invention provides a seat with convenient operation and simple structure and a baby carriage equipped with the seat, so as to solve the aforesaid problems.

According to an embodiment of the invention, a seat comprises a support base, an unlock member and a lock member. The support base has at least one through hole. The unlock member is movably disposed on the support base and has at least one first driving portion. The lock member is movably disposed on the unlock member. The lock member has at least one lock portion and at least one second driving portion. The at least one lock portion protrudes from a surface of the support base through the at least one through hole. The at least one second driving portion abuts against the at least one first driving portion. When the unlock member is forced in a first direction to move, the at least one lock portion is forced to move along the at least one first driving portion through the at least one second driving portion and retracts into the support base in a second direction different from the first direction.

According to another embodiment of the invention, a baby carriage comprises a frame and a seat. The frame comprises a fixing base. The fixing base has an engaging hole. The seat comprises a support base, an unlock member and a lock member. The support base has at least one through hole. The unlock member is movably disposed on the support base and has at least one first driving portion. The lock member is movably disposed on the unlock member. The lock member has at least one lock portion and at least one second driving portion. The at least one lock portion protrudes from a surface of the support base through the at least one through hole. The at least one second driving portion abuts against the at least one first driving portion. The support base is inserted into the fixing base and one of the at least one lock portion engages with the engaging hole, such that the seat is fixed on the frame. When the unlock member is forced in a first direction to move, the at least one lock portion is forced to move along the at least one first driving portion through the at least one second driving portion and retracts into the support base in a second direction different from the first direction, such that one of the at least one lock portion disengages from the engaging hole.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
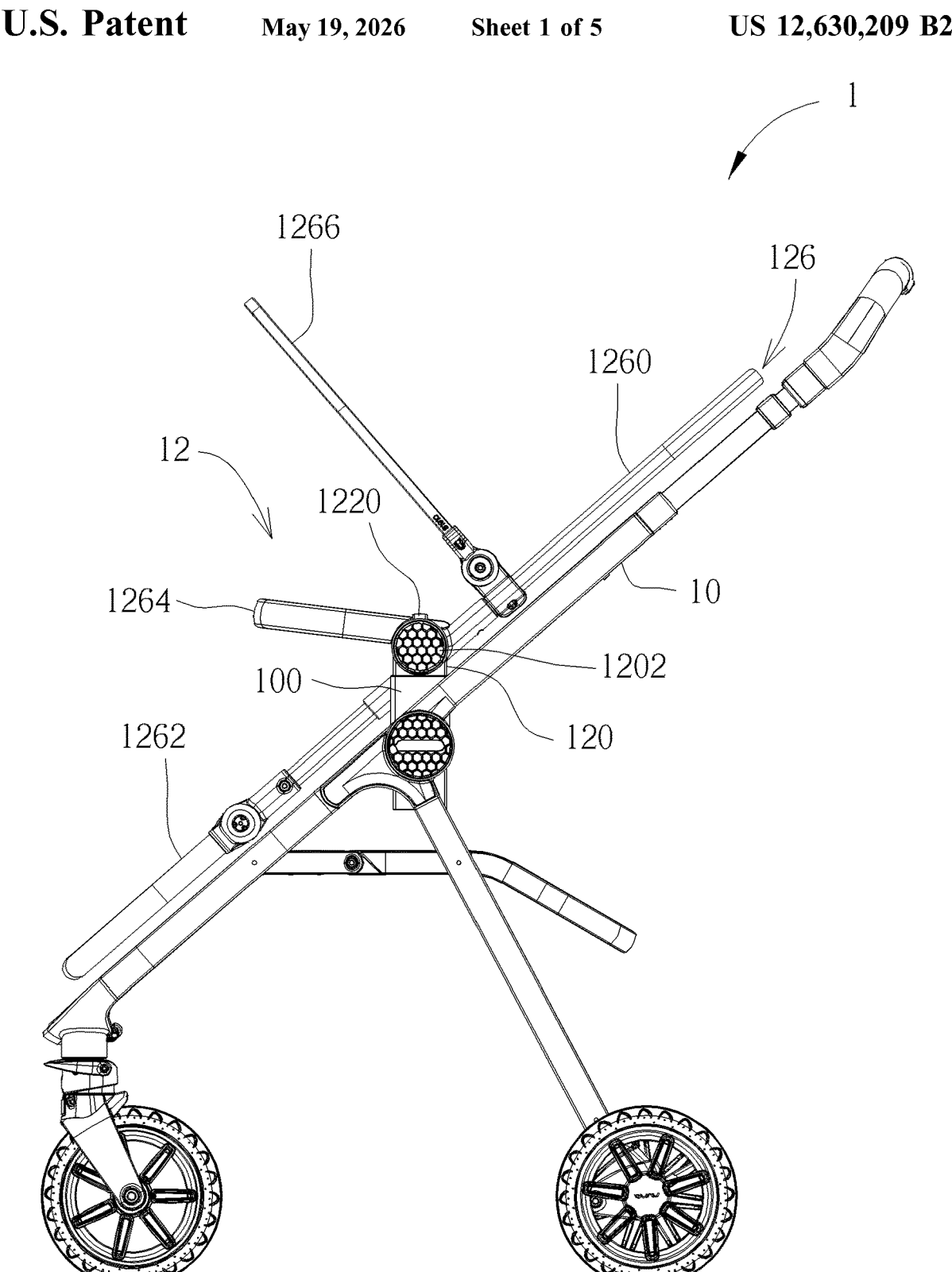
FIG. 1 is a side view illustrating a baby carriage according to an embodiment of the invention.
Figure 2:
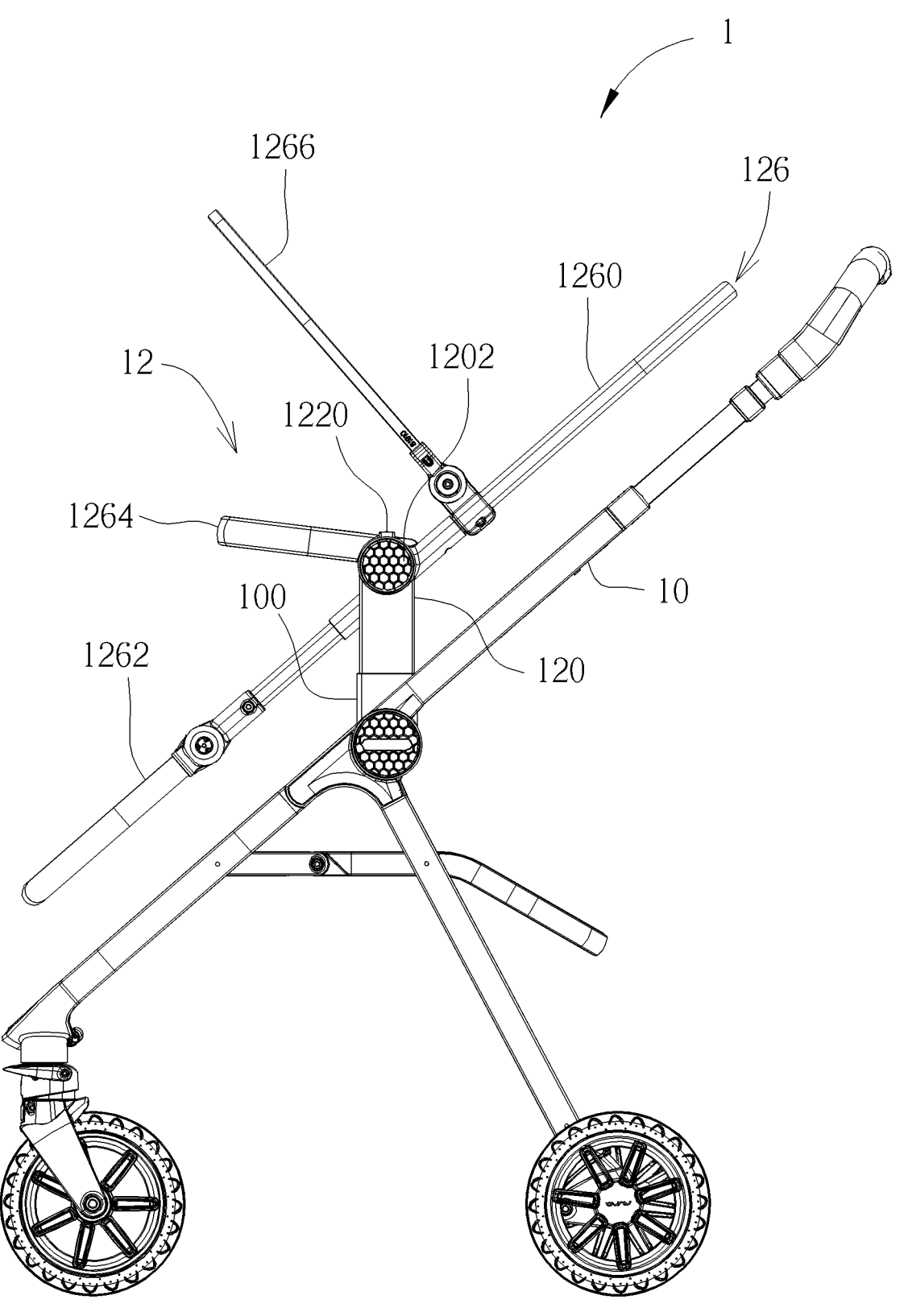
FIG. 2 is a side view illustrating a seat shown in FIG. 1 being adjusted to another height.
Figure 3:
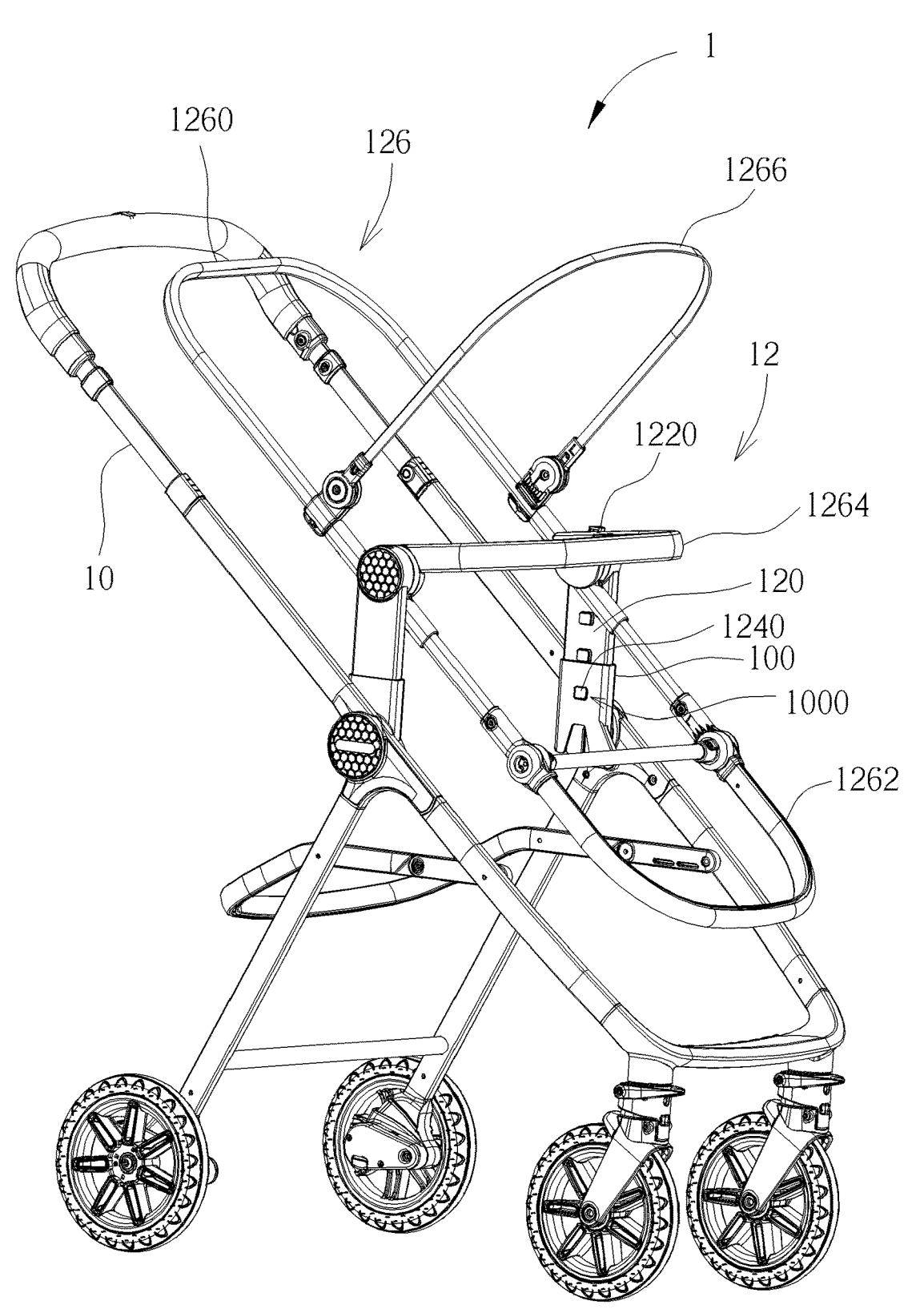
FIG. 3 is a perspective view illustrating the baby carriage shown in FIG. 2.
Figure 4:
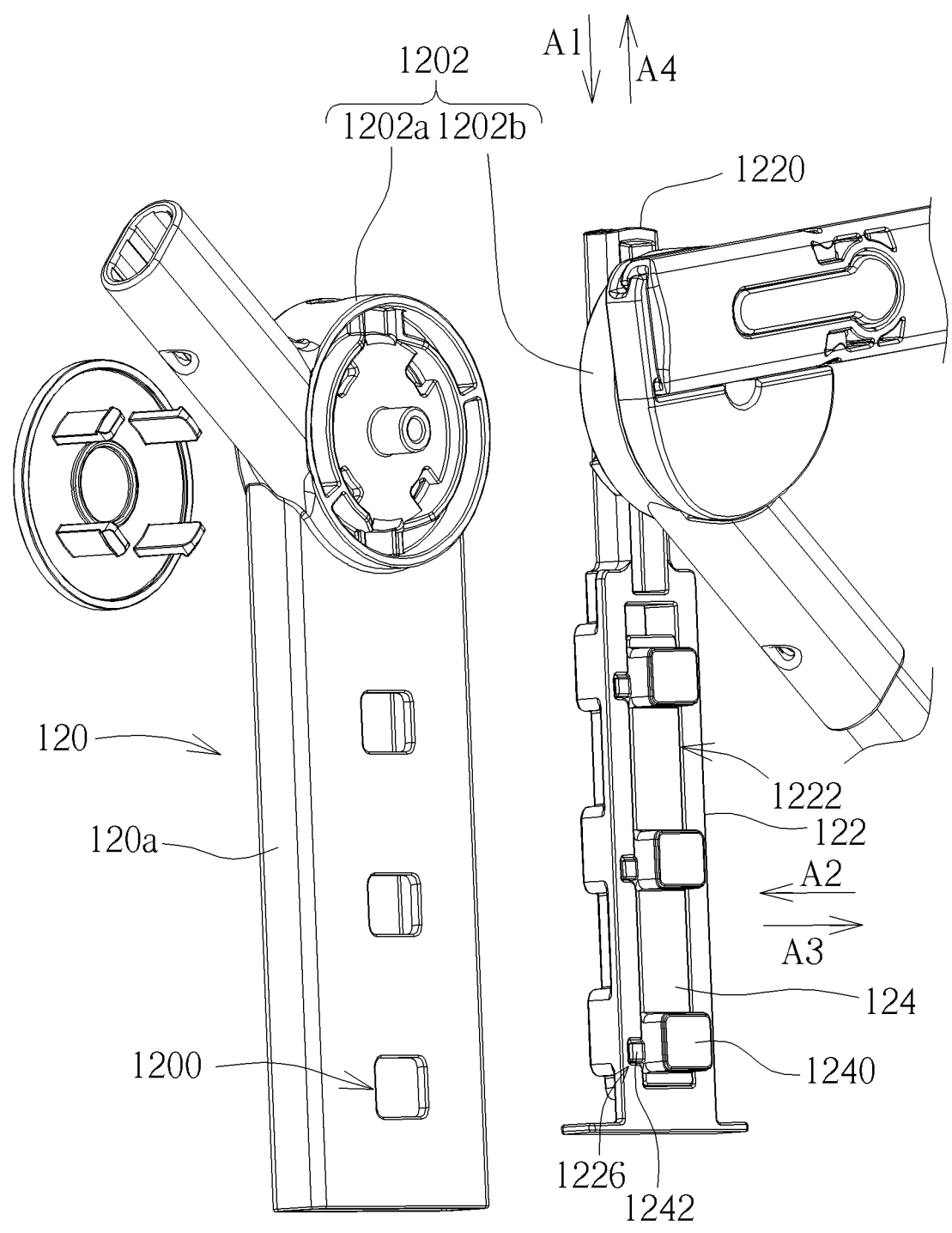
FIG. 4 is an exploded view illustrating a support base and an unlock member.
Figure 5:
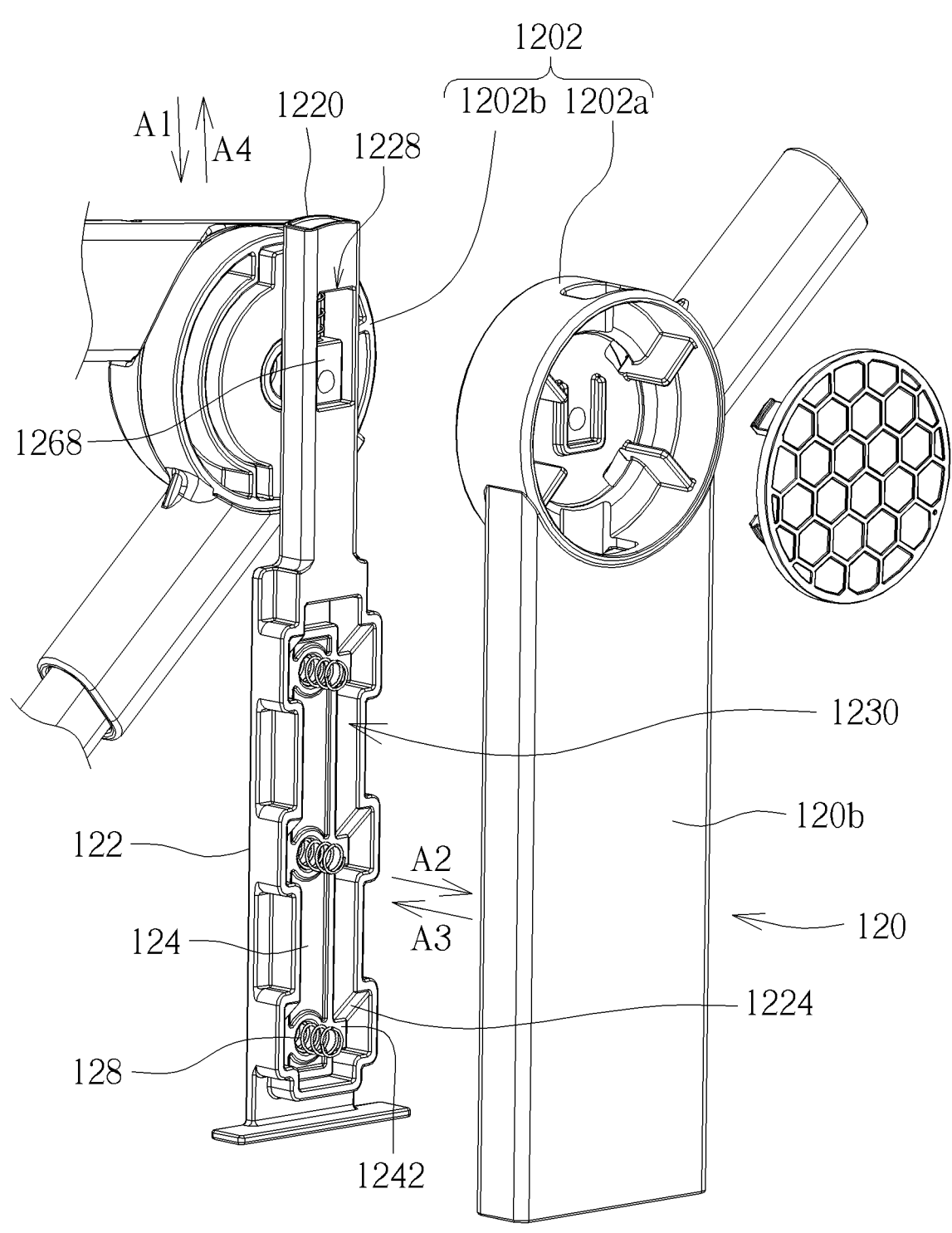
FIG. 5 is an exploded view illustrating the support base and the unlock member shown in FIG. 4 from another viewing angle.

Referring to FIGS. 1 to 5, FIG. 1 is a side view illustrating a baby carriage 1 according to an embodiment of the invention, FIG. 2 is a side view illustrating a seat 12 shown in FIG. 1 being adjusted to another height, FIG. 3 is a perspective view illustrating the baby carriage 1 shown in FIG. 2, FIG. 4 is an exploded view illustrating a support base 120 and an unlock member 122, and FIG. 5 is an exploded view illustrating the support base 120 and the unlock member 122 shown in FIG. 4 from another viewing angle.

As shown in FIGS. 1 and 2, the baby carriage 1 of one embodiment according to the invention comprises a frame 10 and a seat 12. The baby carriage 1 may be a stroller or other carriages. The seat 12 is disposed on the frame 10. The seat 12 of the baby carriage 1 has a height adjusting mechanism for a user to adjust the height of the seat 12 according to different babies or children, thereby making the babies or children more comfortable. It should be noted that the structures of the baby carriage 1 and the seat 12 of one embodiment according to the invention are substantially symmetrical, and the technical features of the height adjusting mechanism of one embodiment according to the invention will be described by the structure of one side in the following.

As shown in FIG. 3, the frame 10 comprises a fixing base 100. As shown in FIGS. 3 to 5, the seat 12 comprises a support base 120, an unlock member 122, a lock member 124, a seat body 126 and a plurality of return members 128. It should be noted that the number of the return members 128 may be at least one according to practical applications. The support base 120 is movably inserted into the fixing base 100 of the frame 10 and the seat body 126 is disposed on the support base 120. Thus, the support base 120 may move with respect to the fixing base 100 of the frame 10 to adjust the height of the seat body 126.

As shown in FIGS. 1 to 3, the seat body 126 may comprise a backrest 1260, a calf rest 1262, a handrail 1264 and a canopy 1266. The backrest 1260 and the handrail 1264 are pivotally connected to a pivot portion 1202 of the support base 120, the calf rest 1262 is pivotally connected to a lower end of the backrest 1260, and the canopy 1266 is rotatably connected to a middle portion of the backrest 1260, such that the pivot portion 1202 is located between the canopy 1266 and the calf rest 1262. Thus, the calf rest 1262, the handrail 1264 and the canopy 1266 may rotate with respect to the backrest 1260 to be folded or unfolded. In practical applications, the backrest 1260 and the calf rest 1262 may be covered by a fabric to form a seat area for seating. In another embodiment, the seat body 126 may be further equipped with other support or reinforced structures (e.g. seat plate) according to practical applications. It should be noted that the structure of the seat body 126 may be determined according to practical applications, so the invention is not limited to the embodiment shown in the figures.

As shown in FIG. 4, a front casing 120*a* of the support base 120 has a plurality of through hole 1200 and the through holes 1200 are arranged in intervals along a lengthwise direction of the support base 120. It should be noted that the number of the through holes 1200 may be at least one according to practical applications. The unlock member 122 is movably disposed on the support base 120. In this embodiment, the unlock member 122 is movably disposed between the front casing 120*a* (as shown in FIG. 4) and a rear casing 120*b* (as shown in FIG. 5) of the support base 120. As shown in FIGS. 4 and 5, the unlock member 122 has an operating portion 1220, a longitudinal groove 1222, a plurality of first driving portions 1224 and a plurality of restraining recesses 1226, and an accommodating space 1230 is formed between the unlock member 122 and the rear casing 120*b* of the support base 120. It should be noted that the number of the first driving portions 1224 and the restraining recesses 1226 may be at least one according to practical applications. The operating portion 1220 is located at an end of the longitudinal groove 1222 and extends out of the support base 120 along a lengthwise direction of the longitudinal groove 1222. The first driving portions 1224 are located in the accommodating space 1230 and arranged at at least one side of the longitudinal groove 1222 along the lengthwise direction of the longitudinal groove 1222. In some embodiments, the first driving portions 1224 are arranged at opposite sides of the longitudinal groove 1222. Furthermore, the restraining recesses 1226 are located at aside of the unlock member 122 facing the front casing 120*a* of the support base 120 and disposed at at least one side of the longitudinal groove 1222. The lock member 124 is movably disposed on the unlock member 122. In this embodiment, the lock member 124 is movably disposed in the accommodating space 1230 of the unlock member 122, wherein a moving direction of the unlock member 122 is substantially perpendicular to a moving direction of the lock member 124, but the invention is not so limited. As shown in FIGS. 4 and 5, the lock member 124 has a plurality of lock portions 1240 and a plurality of second driving portions 1242, wherein the second driving portions 1242 are located at a side of the lock portions 1240. The lock portions 1240 and the second driving portions 1242 are arranged in intervals along a lengthwise direction of the lock member 124 and protrude from the longitudinal groove 1222. It should be noted that the number of the lock portions 1240 and the second driving portions 1242 maybe at least one according to practical applications. As shown in FIG. 5, the return members 128 are disposed in the accommodating space 1230 and opposite ends of each return member 128 abut against the lock member 124 and the support base 120. In some embodiments, the positions of the return members 128 correspond to the positions of the lock portions 1240 (as shown in FIG. 4). The return members 128 may be, but is not limited to, springs.

As shown in FIGS. 3 and 4, after assembling the support base 120, the unlock member 122 and the lock member 124, the operating portion 1220 of the unlock member 122 is exposed from the support base 120, the lock portions 1240 of the lock member 124 are disposed in the through holes

1200 of the support base 120, and the second driving portions 1242 of the lock members 124 are restrained in the restraining recesses 1226 of the unlock member 122. At this time, the lock portions 1240 protrude from a surface of the support base 120 through the through holes 1200. Furthermore, as shown in FIG. 5, the second driving portions 1242 of the lock member 124 abut against the first driving portions 1224 of the unlock member 122. In this embodiment, the first driving portions 1224 and the second driving portions 1242 have inclined surfaces abutting against each other.

As shown in FIG. 5, the pivot portion 1202 comprises a first pivot portion 1202*a* and a second pivot portion 1202*b*. The first pivot portion 1202*a* is pivotally connected to the backrest 1260 and the second pivot portion 1202*b* is pivotally connected to the handrail 1264. The unlock member 122 further has a slot 1228 and the second pivot portion 1202*b* has an insertion portion 1268. The insertion portion 1268 passes through the slot 1228 of the unlock member 122 and the first pivot portion 1202*a* is pivotally connected to the insertion portion 1268, such that the first pivot portion 1202*a* and the second pivot portion 1202*b* rotate with respect to each other. When the unlock member 122 moves upward and downward with respect to the support base 120, the slot 1228 may serve as an avoidance space for the insertion portion 1268, so as to prevent the unlock member 122 from interfering with the insertion portion 1268.

As shown in FIG. 3, the fixing base 100 of the frame 10 has an engaging hole 1000. One of the lock portions 1240 of the lock member 124 engages with the engaging hole 1000, such that the seat 12 is fixed on the frame 10. At this time, the seat 12 may be kept at a fixed height. When a user wants to adjust the height of the seat 12, the user may press the operating portion 1220 of the unlock member 122. As shown in FIGS. 3 to 5, when the operating portion 1220 of the unlock member 122 is pressed in a first direction A1, the unlock member 122 is forced in the first direction A1 to move, such that the lock member 124 is forced in the first direction A1. When the lock member 124 is forced in the first direction A1, the lock portions 1240 retracts into the support base 120 in a second direction A2 different from the first direction A1. For further explanation, when the unlock member 122 is pressed to move in the first direction A1, the first driving portions 1224 of the unlock member 122 will push the second driving portions 1242 of the lock member 124 to drive the lock member 124 to move in the second direction A2. At this time, the lock member 124 is forced to move along the first driving portions 1224 through the second driving portions 1242 and retracts into the support base 120, such that one of the lock portions 1240 disengages from the engaging hole 1000 of the fixing base 100. At this time, the user may move the seat 12 upward and downward to adjust the height of the seat 12. When the operating portion 1220 of the unlock member 122 is pressed in the first direction A1, the lock member 124 moves in the second direction A2 to compress the return members 128. Thus, after adjusting the height of the seat 12, as long as the user releases the unlock member 124, the return member 128 will push the lock member 124 in a third direction A3, such that one of the lock portions 1240 of the lock member 124 again engages with the engaging hole 1000 of the fixing base 100 of the frame 10. When the return members 128 pushes the lock member 124 in the third direction A3, the second driving portions 1242 of the lock member 124 will push the first driving portions 1224 of the unlock member 122 to drive the unlock member 122 to move in a fourth direction A4, such that the unlock member 122 returns.

Furthermore, the user may also detach the seat 12 from the frame 10 by pressing the operating portion 1220 of the unlock member 122 to disengage one of the lock portions 1240 from the engaging hole 1000 of the fixing base 100. In other words, as long as the user presses the operating portion 1220 of the unlock member 122, the height of the seat 12 may be adjusted or the seat 12 may be detached from the frame 10. The operation is quite convenient.

In this embodiment, the number of the through holes 1200, the first driving portions 1224, the restraining recesses 1226, the lock portions 1240, the second driving portions 1242 and the return members 128 are respectively three, such that the height of the seat 12 may be adjusted in three stages. Thus, the invention may increase or decrease the number of stages for adjusting the height of the seat 12 by increasing or decreasing the number of the through holes 1200, the first driving portions 1224, the restraining recesses 1226, the lock portions 1240, the second driving portions 1242 and the return members 128, so the invention is not limited to the embodiment shown in the figures.

As mentioned in the above, as long as a user presses the operating portion of the unlock member, the lock portion of the lock member retracts into the support base to disengage from the engaging hole of the fixing base of the frame. At this time, the user may move the seat upward and downward to adjust the height of the seat. After adjusting the height of the seat, as long as the user releases the unlock member, the lock portion of the lock member again engages with the engaging hole of the fixing base of the frame. The invention may form a height adjusting mechanism of the seat by the support base, the unlock member and the lock member, which not only has a simple structure, but also is convenient to operate, thereby further reducing the manufacturing cost of the seat and the baby carrier. Furthermore, in some embodiments, the support base may have one single through hole and the lock member may have one single lock portion. At this time, the invention may allow the user to detach the seat easily by the cooperation between one single through hole and one single lock portion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby carriage comprising:
   a frame comprising a fixing base, the fixing base having an engaging hole; and
   a seat comprising:
   a support base having a plurality of through holes;
   an unlock member movably disposed on the support base and having a plurality of first driving portions, the plurality of first driving portions being arranged in intervals along a moving direction of the unlock member; and
   a lock member movably disposed on the unlock member, the lock member having a plurality of lock portions and a plurality of second driving portions, the plurality of second driving portions being located at a side of the plurality of lock portions, the plurality of lock portions and the plurality of second driving portions being arranged in intervals along the moving direction of the unlock member, the plurality of lock portions protruding from a surface of the support base through the plurality of through holes, the plurality of second driving portions abutting against the plurality of first driving portions;
   wherein the support base is inserted into the fixing base and one of the plurality of lock portions engages with the engaging hole, such that the seat is fixed on the frame; when the unlock member is forced in a first direction to move, the plurality of lock portions is forced to move along the plurality of first driving portions through the plurality of second driving portions and retracts into the support base in a second direction different from the first direction, such that one of the plurality of lock portions disengages from the engaging hole.

2. The baby carriage according to claim 1, wherein the support base comprises a front casing and a rear casing, the front casing has the plurality of through holes, and the unlock member is movably disposed between the front casing and the rear casing.

3. The baby carriage according to claim 2, wherein the unlock member has an operating portion and a longitudinal groove, an accommodating space is formed between the unlock member and the rear casing, the operating portion is located at an end of the longitudinal groove and extends out of the support base along a lengthwise direction of the longitudinal groove, and the plurality of first driving portions are located in the accommodating space and arranged at at least one side of the longitudinal groove along the lengthwise direction of the longitudinal groove.

4. The baby carriage according to claim 3, wherein the lock member is movably disposed in the accommodating space.

5. The baby carriage according to claim 3, wherein the unlock member further has a plurality of restraining recesses disposed at the at least one side of the longitudinal groove and the plurality of second driving portions are restrained in the plurality of restraining recesses.

6. The baby carriage according to claim 1, wherein the plurality of first driving portions and the plurality of second driving portions have inclined surfaces abutting against each other.

7. The baby carriage according to claim 1, wherein a moving direction of the unlock member is perpendicular to a moving direction of the lock member.

8. The baby carriage according to claim 1, wherein the seat further comprises a plurality of return members disposed between the lock member and the support base, and positions of the plurality of return members correspond to positions of the plurality of lock portions.

9. The baby carriage according to claim 1, wherein the seat further comprises a seat body disposed on the support base.

10. The baby carriage according to claim 9, wherein the seat body comprises a backrest and a calf rest, the backrest is pivotally connected to a pivot portion of the support base, and the calf rest is pivotally connected to a lower end of the backrest.

11. The baby carriage according to claim 10, wherein the seat body further comprises a canopy rotatably connected to a middle portion of the backrest, such that the pivot portion is located between the canopy and the calf rest.

12. The baby carriage according to claim 10, wherein the seat body further comprises a handrail pivotally connected to the calf rest.

13. The baby carriage according to claim 12, wherein the pivot portion comprises a first pivot portion and a second pivot portion, the first pivot portion is pivotally connected to the backrest, the second pivot portion is pivotally connected to the handrail, the unlock member further has a slot, the second pivot portion has an insertion portion, the insertion portion passes through the slot, and the first pivot portion is pivotally connected to the insertion portion, such that the first pivot portion and the second pivot portion rotate with respect to each other.

14. A seat comprising:
a support base having a plurality of through holes;
an unlock member movably disposed on the support base and having a plurality of first driving portions, the plurality of first driving portions being arranged in intervals along a moving direction of the unlock member; and
a lock member movably disposed on the unlock member, the lock member having a plurality of lock portions and a plurality of second driving portions, the plurality of second driving portions being located at a side of the plurality of lock portions, the plurality of lock portions and the plurality of second driving portions being arranged in intervals along the moving direction of the unlock member, the plurality of lock portions protruding from a surface of the support base through the plurality of through holes, the plurality of second driving portions abutting against the plurality of first driving portions;
wherein, when the unlock member is forced in a first direction to move, the plurality of lock portions is forced to move along the plurality of first driving portions through the plurality of second driving portions and retracts into the support base in a second direction different from the first direction.

15. The seat according to claim 14, wherein the support base comprises a front casing and a rear casing, the front casing has the plurality of through holes, and the unlock member is movably disposed between the front casing and the rear casing.

16. The seat according to claim 15, wherein the unlock member has an operating portion and a longitudinal groove, an accommodating space is formed between the unlock member and the rear casing, the operating portion is located at an end of the longitudinal groove and extends out of the support base along a lengthwise direction of the longitudinal groove, and the plurality of first driving portions are located in the accommodating space and arranged at at least one side of the longitudinal groove along the lengthwise direction of the longitudinal groove.

17. The seat according to claim 16, wherein the lock member is movably disposed in the accommodating space.

18. The seat according to claim 16, wherein the unlock member further has a plurality of restraining recesses disposed at the at least one side of the longitudinal groove and the plurality of second driving portions are restrained in the plurality of restraining recesses.

19. The seat according to claim 14, wherein the plurality of first driving portions and the plurality of second driving portions have inclined surfaces abutting against each other.

20. The seat according to claim 14, wherein a moving direction of the unlock member is perpendicular to a moving direction of the lock member.

21. The seat according to claim 14, further comprising a plurality of return members disposed between the lock member and the support base, positions of the plurality of return members corresponding to positions of the plurality of lock portions.

22. The seat according to claim 14, further comprising a seat body disposed on the support base.

23. The seat according to claim 22, wherein the seat body comprises a backrest and a calf rest, the backrest is pivotally connected to a pivot portion of the support base, and the calf rest is pivotally connected to a lower end of the backrest.

24. The seat according to claim 23, wherein the seat body further comprises a canopy rotatably connected to a middle portion of the backrest, such that the pivot portion is located between the canopy and the calf rest.

25. The seat according to claim 23, wherein the seat body further comprises a handrail pivotally connected to the calf rest.

26. The seat according to claim 25, wherein the pivot portion comprises a first pivot portion and a second pivot portion, the first pivot portion is pivotally connected to the backrest, the second pivot portion is pivotally connected to the handrail, the unlock member further has a slot, the second pivot portion has an insertion portion, the insertion portion passes through the slot, and the first pivot portion is pivotally connected to the insertion portion, such that the first pivot portion and the second pivot portion rotate with respect to each other.

* * * * *